United States Patent
Harpalani et al.

(10) Patent No.: US 9,275,368 B1
(45) Date of Patent: Mar. 1, 2016

(54) ANNOTATION MAPPING

(71) Applicants: Manoj Suresh Harpalani, Seattle, WA (US); Michael Patrick Bacus, Seattle, WA (US); Shawn C. Deyell, Lake Forest Park, WA (US); Sherif M. Yacoub, Seattle, WA (US); Daniel W. Shafer, Seattle, WA (US); Ameya B. Datar, Bellevue, WA (US)

(72) Inventors: Manoj Suresh Harpalani, Seattle, WA (US); Michael Patrick Bacus, Seattle, WA (US); Shawn C. Deyell, Lake Forest Park, WA (US); Sherif M. Yacoub, Seattle, WA (US); Daniel W. Shafer, Seattle, WA (US); Ameya B. Datar, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 481 days.

(21) Appl. No.: 13/626,814

(22) Filed: Sep. 25, 2012

(51) Int. Cl.
*G06Q 10/10* (2012.01)
*G06F 17/24* (2006.01)

(52) U.S. Cl.
CPC .............. *G06Q 10/10* (2013.01); *G06F 17/241* (2013.01)

(58) Field of Classification Search
CPC ........ G06Q 10/10; G06F 17/24; G06F 17/241
USPC ....................................................... 715/289, 22
See application file for complete search history.

(56) References Cited

U.S. PATENT DOCUMENTS

| | | | | |
|---|---|---|---|---|
| 4,807,182 A | * | 2/1989 | Queen | 715/210 |
| 6,249,779 B1 | * | 6/2001 | Hitt | 706/1 |
| 6,904,454 B2 | * | 6/2005 | Stickler | 709/213 |
| 7,937,652 B2 | * | 5/2011 | Aizawa | 715/232 |
| 2002/0133628 A1 | * | 9/2002 | Asplund et al. | 709/246 |
| 2003/0212712 A1 | * | 11/2003 | Gu et al. | G06F 17/30067 |
| 2004/0102958 A1 | * | 5/2004 | Anderson, IV | 704/4 |
| 2005/0160356 A1 | * | 7/2005 | Albornoz et al. | 715/512 |
| 2005/0165852 A1 | * | 7/2005 | Albornoz et al. | 707/200 |
| 2007/0061704 A1 | * | 3/2007 | Simova et al. | 715/512 |
| 2008/0284582 A1 | * | 11/2008 | Wang et al. | 340/521 |
| 2009/0007267 A1 | * | 1/2009 | Hoffmann | 726/22 |
| 2010/0127900 A1 | * | 5/2010 | Schneider | H03M 7/3088 341/51 |
| 2010/0138213 A1 | * | 6/2010 | Bicici et al. | 704/4 |

* cited by examiner

*Primary Examiner* — Stephen Hong
*Assistant Examiner* — Hope C Sheffield
(74) *Attorney, Agent, or Firm* — Lowenstein Sandler LLP

(57) ABSTRACT

A method for annotation mapping includes identifying a set of differences between a first version of a document and a second version of the document, the first version comprising annotations. The method further includes generating a position map that maps differences between the first version and the second version, where the position map facilitates the migration of the annotations from the first version to the second version.

24 Claims, 11 Drawing Sheets

100

ANNOTATION MAPPING

BACKGROUND

Publishers and other content providers often make changes in the content of a book after publishing the first copy, especially in digital books where the distribution costs are extremely low. These changes can be versioned and can include changes such as correction of a typographical error or an optical character recognition (OCR) error, errors in translation or conversion of printed material, removal of extra white spaces, formatting changes, insertion or deletion of paragraphs, words, images, chapters, or any combination thereof. eReader software allows users to annotate such digital books by inserting comments, highlights, notes, reminders, links and so forth. However, a customer who has an old version of a digital book is unable to upgrade to a newer version of the content without losing the annotations they have made on this content, because the annotations are tied to that particular version of content and are not portable.

Thus, when a content provider makes new content available, customers are forced to choose between receiving the updated content and losing all of their custom annotations or manually reentering their custom annotations, or retaining the old content and preserving their annotations. Some marketplace statistics show that among all the customers who are offered an upgrade with the condition that they lose all their existing annotations, only about 20% of customers choose to upgrade. This means that the customer can not judge how much the new content has been improved without losing their annotations, and has a difficult time making this decision.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Figure 1:
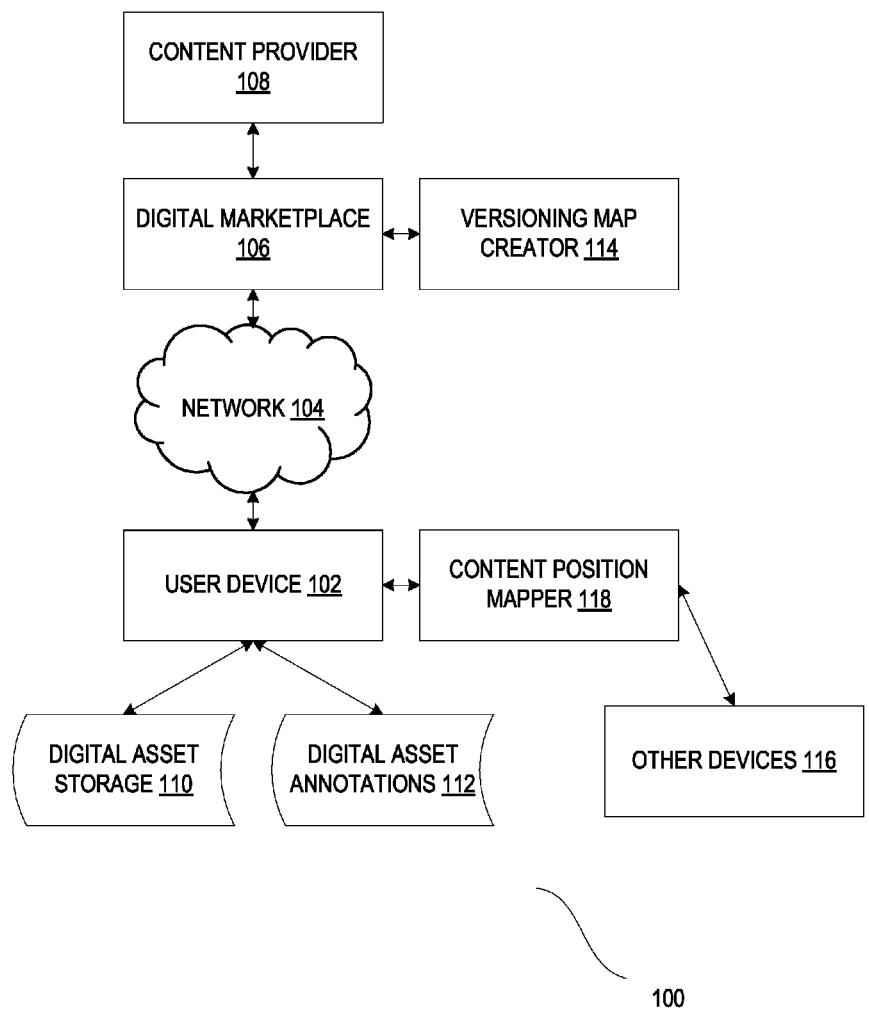
FIG. 1 illustrates an example architecture for providing an updated version of content to a user device which migrates annotations from a previous version of the content to the updated version of the content.

Described herein are methods, systems and non-transitory computer-readable storage media for mapping differences between versions of a document to facilitate migration of annotations between versions. Differences between versions include any portions of text, images, formatting and other content in a document that changes from one version to another version. Differences can be very small, such as correcting a typographical error, or can be very large, such as inserting an entire new chapter in a book. In one embodiment, the document is an electronic textbook, and the annotations can include typed or handwritten student notes, highlighted portions of text, images, video, audio, tags, links to network content, last read position, bookmarks, favorites and so forth. An example is provided of a textbook, but the principles set forth herein are applicable to any electronic document. As is often the case with textbooks, a publisher releases frequent updates with new material, corrections to typographical errors, content errors, or other types of errors, content additions, content deletions, updated formatting and so forth. Either a server or a client device can correlate the differences between the old version and the new version of the electronic textbook, and use that information to migrate annotations of the old version of the electronic textbook to the new version of the electronic textbook. In this way, the user can have access to the newest content and the newest version of the electronic textbook without sacrificing existing annotations. This can be an important consideration for some users, as the amount of time and effort spent to generate annotations, as well as their corresponding value to the user, can be very high. The solution set forth herein aligns and maps byte offsets of words, images and other types of content of different versions of an electronic book so that annotations or user metadata can be freely migrated and preserved from one version to another. While the example embodiments set forth herein focus primarily on mapping for migrating annotations between versions, the same mapping principles can be applied to page numbers, page navigation, table of contents, or any other content, layout, or design aspect of an eBook.

Rather than just computing the differences between versions, this approach can align the old and new content on a word by word basis so that each word and image in the old version can be mapped to the new version in addition to identifying the changes that occurred. This version to version mapping can allow annotations to be migrated from any version to any other version, as long as either a single mapping between those versions exists or an uninterrupted chain of valid mappings between the two versions exists. In one embodiment, annotations are stored as references of byte offsets of the old version of the book and are not usable with the new content version without adaptation to byte offsets that correspond to the new content version. The position maps align content between versions, and allow for migration of annotations from one version of content to another, preserving customer annotations during an upgrade. Further, if a string of text is moved from one location to another location in the document, then the system can identify this move and mark the change as a transposition instead of a delete at one location and a separate, unrelated insert at another location.

In one embodiment of annotation mapping, map creation is separate from position mapping. In map creation, when a new update is released, the system can create position maps for all prior versions to the latest version. This approach can save time versus creating the same maps over and over for different customers. Position mapping then can look up the maps created and translate the positions using the pre-created maps. In some cases with personal documents, the system can incorporate on-the-fly map creation where map creation and position mapping occur back to back or at the same time. The position mapper could then run on server side if the client backs up annotation to the server. If annotations are not backed up to the server, the client can perform position mapping itself.

FIG. 1 illustrates an example architecture 100 for providing an updated version of content to a user device 102 which migrates (transfers) annotations 112 from a previous version of the content to the updated version of the content. In one embodiment, the system pre-creates maps between an updated version and all previous versions as the updated version is ingested into an online marketplace. Then, a content position mapper just retrieves the appropriate pre-created map for two given versions and translates the annotations. Thus, the system can create maps shortly after the updated version is available, after which customers or users of the document can be notified that the updated version is ready for download and migration of annotations made with a previous version. The user device receives a first version of content from a digital marketplace 106, optionally through a network 104 such as the Internet, and stores the first version of the content in a digital asset storage 110 local to the user device 102, which can be a memory, a hard disk, volatile or non-volatile storage, a cache, a solid state drive and so forth. The digital marketplace 106 receives content from a content provider 108, such as a publisher, author, or other source. While reading or consuming the first version of the content, the user can insert digital asset annotations 112, which can be recorded and stored locally on the user device 102, on removable media, or at some other location. The annotations 112 can be stored as part of the content, or can be stored in a separate file associated with the content. Some annotations 112 are not inserted by the user, but are automatically generated by the user device 102 as the user reads the first version of the content.

The content provider 108 can submit an updated version to the digital marketplace 106. The digital marketplace 106 can notify the user device 102 of the updated version, or the user device 102 can query the digital marketplace 106 to check for a new version. In some embodiments, the user device 102 interacts directly with the content provider 108. When the digital marketplace 106 is preparing to receive, receives, or has already received the updated version, the digital marketplace 106 can cause the versioning map creator 114 to generate a map between the first version and any other previous versions and the updated version. The versioning map creator 114 can include local software or hardware components of the digital marketplace 106, can be a web service or some other network-accessible service having an application programming interface (API) for other devices to access the service, or some combination thereof. The versioning map creator 114 and the content position mapper 118 can operate on the same device or on different devices, as shown in FIG. 1. The content versioning system or versioning map creator 114 creates the position maps, while the content position mapper 118 can translate any position data from one version to another using the position maps created by the content versioning system.

In some embodiments, the versioning map creator 114 and the content position mapper 118 operate with the digital marketplace 106 (e.g., on one or more server machines that are part of the digital marketplace). For example, user device 102 can provide user annotations 112 to the digital marketplace 106 (e.g., by periodically backing up the annotations 112 to the digital marketplace 106), and the digital marketplace can use the content position mapper 118 to perform annotation migration for a new version prior to downloading the new version to the user device 102. Depending on the user preferences (e.g., as specified in the user profile), the annotations 112 can be migrated automatically or upon receiving a confirmation from the user. For example, before downloading the new version to the user device 102, the digital marketplace 106 can display a message on the screen of the user device 102, asking whether the annotations 112 should be migrated from the old version to the new version. In some embodiments, the content position mapper 118 distributes annotations 112 of the user of the user device 102 to other user devices 116 (e.g., in response to the user request or based on user preferences). For example, the user of the user device 102 may be a teacher who wants to distribute annotations 112 to students operating the other devices 116.

In other embodiments, the content position mapper 118 operates on the user device 102. The content position mapper 118 can operate on the user device 102 if a backup annotation option is disabled on the user device to protect user privacy. The content position mapper 118 may receive position maps from the digital marketplace 106 (the versioning map creator 114) and use these position maps to perform annotation migration locally. Depending on user preferences, the content position mapper 118 can perform annotation migration automatically (e.g., upon receiving a new version of content or when the user attempts to open the new version of content), or upon receiving a confirmation from the user. The user may also request that his or her annotations 112 be distributed to other devices 116.

Figure 2:
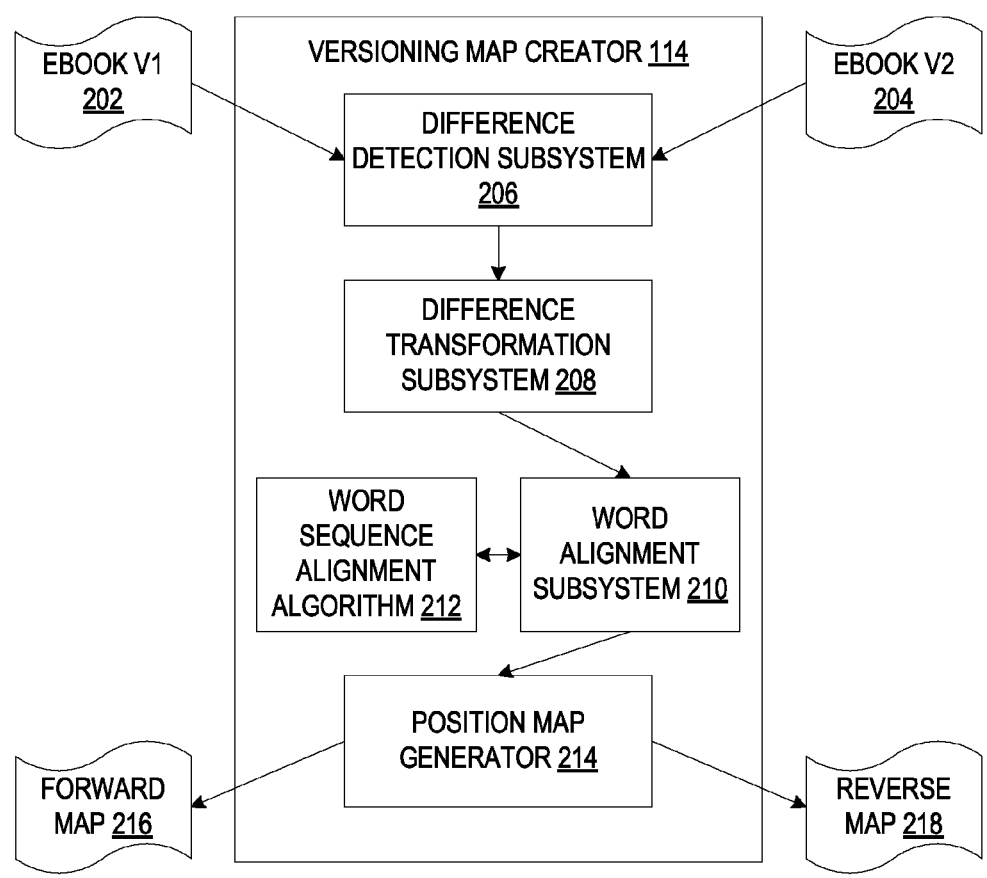
FIG. 2 illustrates an example architecture for a versioning map creator.

FIG. 2 illustrates an example architecture for a versioning map creator 114. The versioning map creator 114 takes as input two versions of an electronic document such as eBooks V1 202 and V2 204. The two versions of the eBooks 202, 204 can be linear, incremental versions of book, such as a first edition of a textbook and a second edition of the textbook. However, the two versions can also include the same content, but formatted differently. For example, the first version can be an eBook stored as an .epub eBook file, and the second version can be the exact same eBook but stored as a .mobi eBook file.

While FIG. 2 illustrates a simple operation of comparing two versions, the versioning map creator 114 can process multiple versions in series or in parallel. In one embodiment, the versioning map creator 114 takes an input version 202 that is a most recent version of an eBook, and generates forward and reverse maps 216, 218 for all previous versions of the eBook. In this way, the versioning map creator 114 can facilitate migration or distribution of annotations from one version of an eBook to any other version of an eBook. For example, annotations created by a user operating on version 5 of an eBook can be migrated or shared, using maps 216, 218 generated for all previous versions of the eBook, to a second user operating on version 2 of the eBook, as well as a third user operating on version 13 of the eBook.

The versioning map creator 114 identifies differences between the two versions of content 202, 204 via a difference detection subsystem 206. In one embodiment, the difference detection subsystem 206 uses a difference algorithm (e.g., a UNIX diff algorithm) customized to compute differences between words of the book using a longest common subsequence of words. In another embodiment, the difference detection subsystem 206 uses a string comparison on a word-by-word basis. Identifying the longest common subsequence can be memory intensive, so a more efficient implementation computes differences in subsequences (chunks) of N words, such as 1,000 words, thus improving the speed and memory footprint of the whole algorithm. However, in some cases 1000 words may not provide sufficient context to compute a difference accurately. For example, if a new chapter was inserted, then the difference detection subsystem 206 might improperly flag the new chapter as a misaligned chunk of 1000 words. For this reason, the difference detection subsystem 206 can automatically expand or shrink the chunk size, up to a maximum value such as 10,000 words, if the current chunk size has less similarity. When the chunk size reaches the maximum value and the difference is greater than a threshold, the difference detection subsystem 206 can stop calculating further differences and conclude that the two versions 202, 204 are completely different or that the content has drastically changed.

Computing differences by chunks can lead to misalignment if adjacent chunks are not stitched correctly together to account for insertions and deletions. Thus, the difference detection subsystem 206 can gracefully carry forward insertions, deletions, or changes from the previous difference iteration to the next, so that they are a part of the next chunk.

In one embodiment, the versioning map creator 114 implements a word sequence alignment algorithm to avoid excessively computationally intensive difference calculations. The problem of aligning two different word sequences is somewhat similar to DNA sequence alignment, so in another embodiment, DNA sequence alignment can be applied to word alignment for content versioning, in which instead of aligning character sequences, the word sequent alignment algorithm aligns word sequences based on the similarity matrices of words. In one example, the difference detection subsystem 206 uses a Smith Waterman Sequence alignment algorithm customized for aligning word sequences and generating a word similarity matrix instead of character sequences. The difference detection subsystem 206 can choose to use the more costly similarity matrix approach in addition to or as a substitute for the simpler difference algorithm in cases where the difference algorithm encounters difficulty in locating differences. A fuzzy string match algorithm that uses fuzzy word similarity matrix can approximate the alignment in these cases.

In some cases publishers use the same identifier to publish a completely new title, which should ideally be not permitted as the metadata associated with the original content would not match the newly submitted content, resulting in a poor customer experience. A customer would think they are buying the original title but would end up with different, entirely new content. The difference detection subsystem 206 can identify cases where the alignment between one version of content and another is below a similarity threshold. In these cases, the difference detection subsystem 206 can generate a message or error indicating that the versions are too different. A user or administrator or the content provider can then step in to identify or correct the problem.

After the difference detection subsystem 206 has located the differences, the difference transformation subsystem 208 can transpose differences, clean up the differences, and identify transpositions and moves. The difference transformation subsystem 208 can iterate over all differences to check if any differences are very close. For example, if two differences are only a single character apart, then the difference transformation subsystem 208 can merge the two differences. The difference transformation subsystem 208 can rely on a distance threshold to determine whether two differences are close enough to merge. The distance threshold can vary based on the size of the differences considered.

Merging close differences can be used to remove false matches, such as when the largest common subsequence algorithm creates a false positive link between two texts having common words like "this," "the," "when," "where," etc. After the difference transformation subsystem 208 removes false links, the difference transformation subsystem 208 iterates through all the differences and compares each delete from the old version to each insert in the new version to identify differences between them. If the difference transformation subsystem 208 finds any matches, the system can mark the difference as a case of transposition where the content is moved from one position to another.

Figure 3:
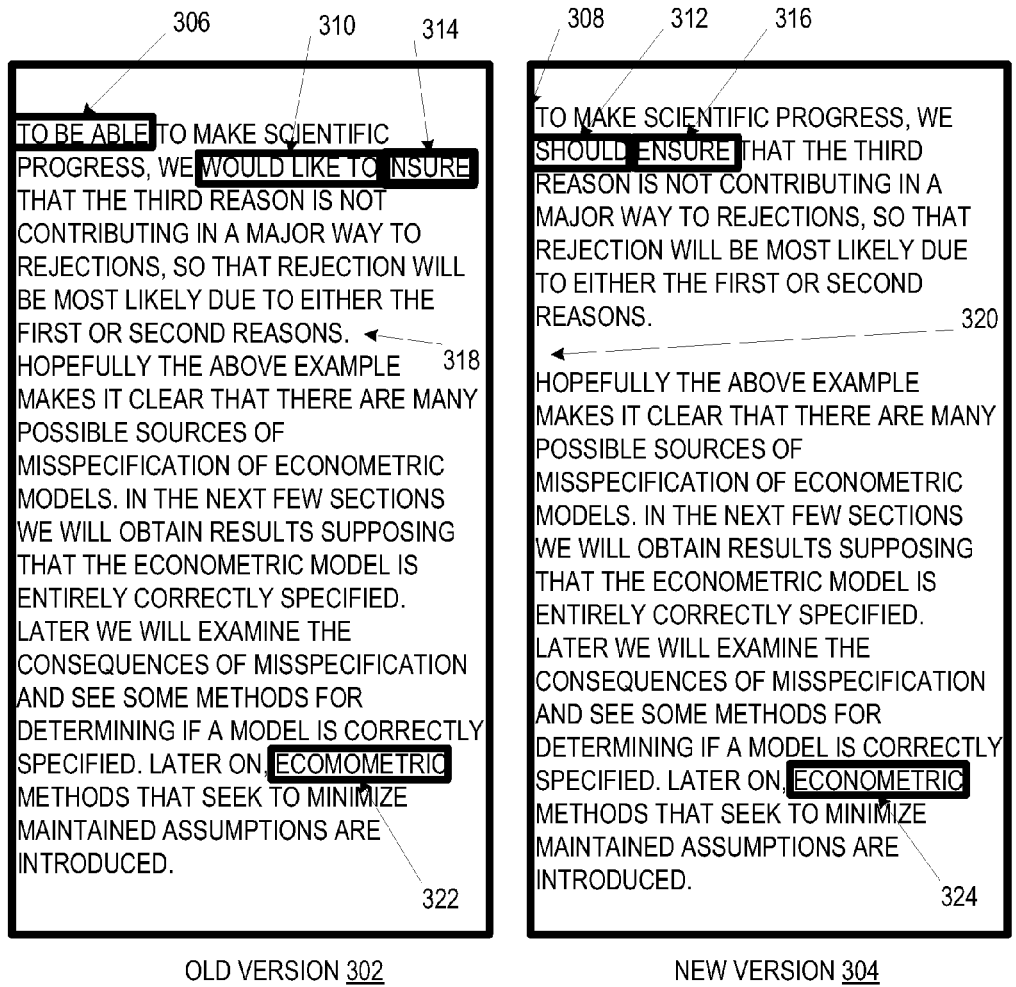
FIG. 3 illustrates an example old version of content and an example updated version of content.

FIG. 3 illustrates an example 300 of an old version 302 and a new version 304 of example text content. This example 300 highlights the differences in shaded boxes. Block 306 in the old version 302 shows the text "TO BE ABLE", which is removed completely at block 308 in the new version 304. Block 310 in the old version 302 shows the text "WOULD LIKE TO", which is replaced with "SHOULD" at block 312 in the new version 304. Immediately following, block 314 in the old version 302 shows the text "INSURE", which is replaced with "ENSURE" at block 316 in the new version 304. This is one example of two differences that are sufficiently close that they can be merged. Instead of maintaining two separate differences, the system can merge these two differences for difference mapping purposes. For examples, instead of maintaining a first difference between "WOULD LIKE TO" and "SHOULD" and a second difference between "INSURE" and "ENSURE," the system can maintain a single difference between "WOULD LIKE TO INSURE" and "SHOULD ENSURE." Block 318 in the old version 302 and block 320 in the new version 304 show how the system can track and identify differences in formatting. In this example, two hard returns have been added. In addition to substantive changes to the text and formatting changes to the text, certain changes, such as typos, do not impact mappings at all. See, for example, block 322 in the old version 302 shows the text "ECOMOMETRIC", which is replaced with "ECONOMETRIC" at block 324 in the new version 304. This difference does not impact mappings, because the byte offsets of this difference are unchanged. Thus, the difference transformation subsystem 208 can ignore this difference between versions.

Returning to FIG. 2, the word alignment subsystem 210 can align reference and comparison words using the transformed differences. Once the differences are detected, computed, cleaned up and transpositions identified, the word alignment subsystem 210 can iterate through the differences and generate an alignment of words between the old and the new version of the book. Depending on the type of difference, such as insert, delete, change, or transposition, the word alignment subsystem 210 aligns the stream of words from the old and new versions. For inserts and deletes, the word alignment subsystem 210 can align the word with a dummy word called NOMATCH that denotes the missing word in corresponding version, or with some other indicator of a missing word such as a null value. Change differences are more complex, and can involve treatment of several edge cases.

If the difference is an OCR error, a typo, or a very small replacement, such as a change that is less than 3 words, the word alignment subsystem 210 can align the corresponding words directly. If the difference is a split word, such as one word in the first version becomes multiple words in the updated version, then the old word was likely split into multiple words due to an issue with missing whitespace or it was replaced by a set of other words. In this case the word alignment subsystem 210 aligns the old word with all the new words in the change. If the difference is a merged word, or multiple words deleted and replaced with a single one word inserted, then the old words were likely replaced by one word or extra whitespace characters were removed. In this case the word alignment subsystem 210 aligns the old words to the corresponding new word. If the change does not satisfy any of the above cases (e.g., multiple words in the old version are changed to multiple words in the new revision, which was not identified in the strict difference algorithm), then the word alignment subsystem 210 can use a sequence alignment algorithm to make a best effort to align these two word sequences. For transposition type changes, the word alignment subsystem 210 can align the deletion and insertion section using the word sequence alignment algorithm 212 so that they are aligned on a best effort basis.

After each word in the old version is aligned to the new version, the position map generator 214 can generate two position maps, a forward map 216 and a reverse map 218 to accommodate the deletion and insertion differences in the correct direction. A forward map 216 provides information for translating an annotation in the old version to the appropriate place in the new version. Likewise, the reverse map 218 provides information for translating an annotation in the new version to the appropriate place in the old version. The position map generator 214 outputs the position of every word in the old revision along with the corresponding position of the new word in the alignment. If the new word is missing in cases of deletion, the position map generator 214 maps the old word to the previous closest word in the new revision in the reverse map. Similarly in case of insertion, the position map generator 214 maps the position of the new words to the closest word in the old revision in the reverse map. Insertions or deletions can be indicated by negative entries in the maps 216, 218. Transpositions which contain insertion or deletion differences can be inserted or deleted inside the forward map 216 or the reverse map 218 at the closest word to the original location.

Figure 4:
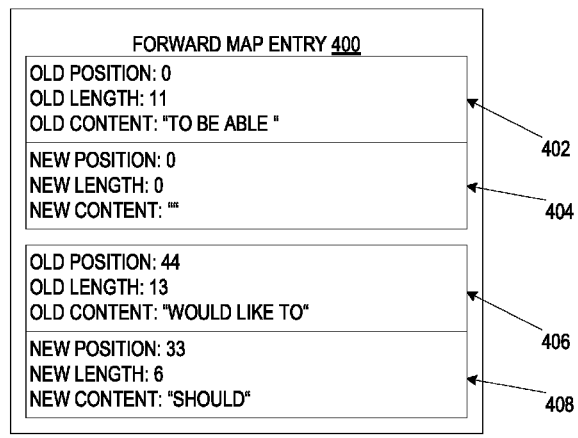
FIG. 4 illustrates an example forward position map of some of the content in FIG. 3.
Figure 5:
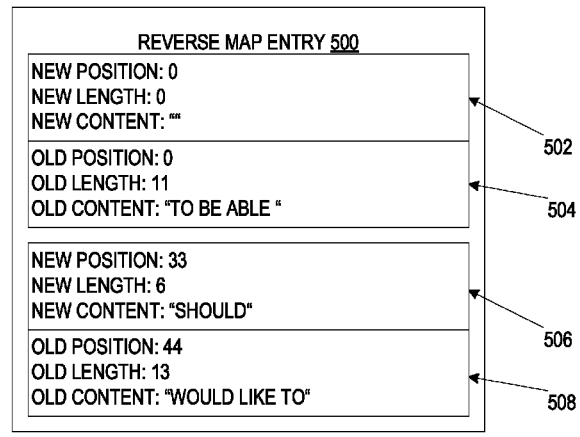
FIG. 5 illustrates an example reverse position map of some of the content in FIG. 3.

FIG. 4 illustrates an example forward position map 400 of some of the content in FIG. 3 and FIG. 5 illustrates an example reverse position map 500 of some of the content in FIG. 3. An entry in the forward position map 400 includes information for a first entry 402, 404 describing a difference between the old version and the new version of the document. The information can include the position, length and content, for example. A second entry 406, 408 is also provided. These forward map entries correspond to the first two differences 306, 308 and 310, 312 of FIG. 3. The entries 502, 504, 506, 508 in the reverse map entry table 500 may contain similar information, but be indexed in the reverse order so that difference can be mapped from the newer version to the prior version. In one embodiment, the forward and reverse position maps 400, 500 are merged into a same map that includes the old position, the new position, the old content, and the new content. A single file can contain one or more forward or reverse maps, including maps for multiple different versions of the content. Maps can include changes in content, or changes in format where the content remains unchanged.

The position maps 400, 500 can then be used to cause the annotations to be transferred from the old document version to the new document version. In one embodiment, this is achieved by the server performing the annotation transfer. In another embodiment, this is achieved by sending the position maps to the user device, which then performs the annotation transfer locally.

Returning to FIG. 1, the user device 102 can share annotations with other devices 116 through the content position mapper 118, even if the other devices 116 have a different versions than the version in which the annotations were created on the user device 102. The annotations and other communications between the user device 102 and the other devices 116 can be transmitted via wired, wireless, or other connection. In some embodiments, the content position mapper 118 serves as a versioning service that allows users to share annotations across versions. For example, a professor may need to share notes with students who have a different version of the textbook. Using the content position mapper 118 as a versioning system, the professor's device can map and share annotations, such as notes or teaching supplements, across versions. Without this versioning system, shared annotations would be limited to single version of content.

In some embodiments, the content position mapper 118 is used to publish popular highlights. Popular highlights are created when highlight annotations are compiled from a group of customers on a content version and published to all users in the form of a downloadable sidecar or metadata package. The content position mapper 118 avoids creating a unique sidecar for every version of content that customers own, which can be a lot of duplicated effort and time, as well as allows a highlight to be shared from one version of the content to another.

In some cases, content providers publish portions of a book in serial fashion. The publisher considers the additional content not as new material or a separate book, but rather as a continuation of existing content and intends to deliver this content as it is published to consumers. The content position mapper 118 allows a publisher to publish and distribute the first version of a serial book, and to continue to add new content to the title and redistribute the content while retaining annotations provided by the customer.

Figure 6:
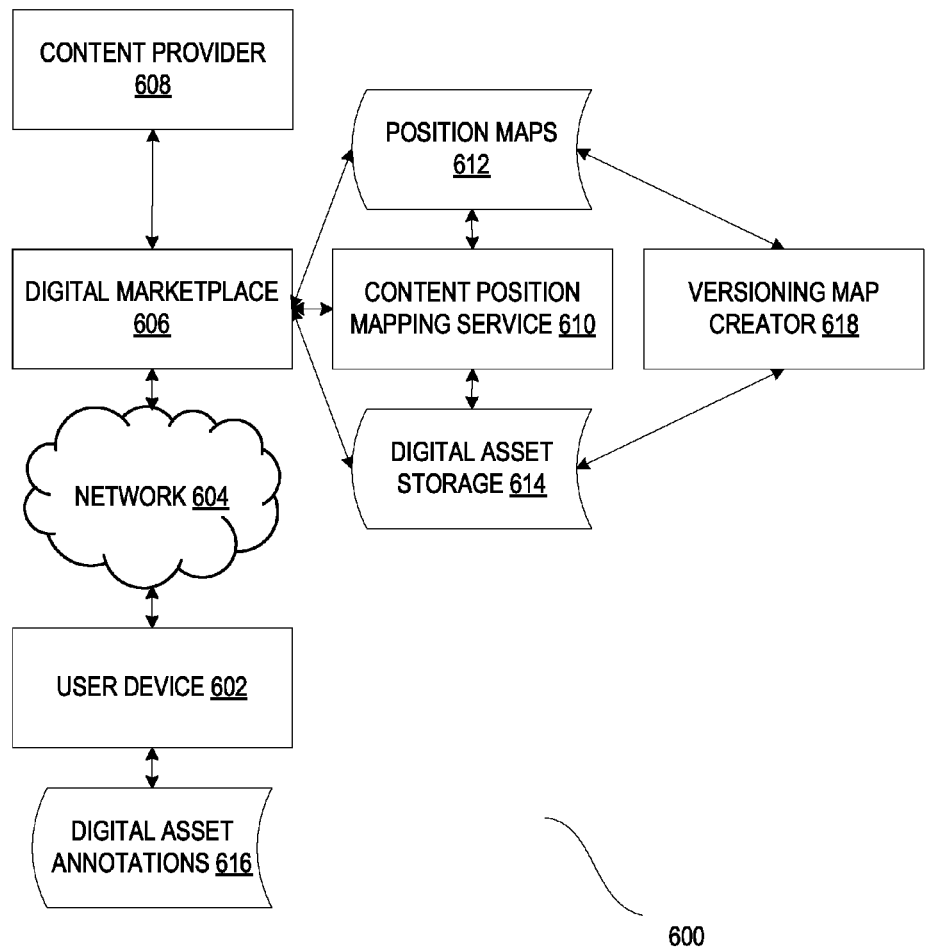
FIG. 6 illustrates an example architecture for a server that generates position maps and provides the position maps to user devices.

FIG. 6 illustrates an example architecture 600 for a digital marketplace 606 that generates position maps 612 for content received from a content provider 608 and can provide the position maps 612 to user devices 602. The versioning map creator 618 can generate the maps 216, 218 as new content is ingested into the digital marketplace 106 or as the user device 102 downloads the new version, for example. In one embodiment, the content position mapping service 610 can map annotations between versions using the maps 216, 218. For example, the content position mapping service 610 can receive annotations 616 associated with the old version ("old annotations") from the user device 602 and use the old annotations and the destination version as input for the annotation migration process. In particular, the content position mapping service 610 can look up a position map cache/store to fetch precreated maps, translate the old annotations using the desired map, and return annotations associated with the new version ("new annotations"). The versioning map creator 618 can compare two document versions to generate a position map 612 between two versions, which the content position mapping service 610 can then use to migrate annotations. In one embodiment, the annotation migration process includes determining, for each annotation, a position within the old document version that corresponds with the annotation, identifying, based on the position maps 612, a position within the new document version that maps to the position within the old document version, and associating the annotation with the identified position within the new document version.

Alternately, the annotation migration process can be performed on the user device 102. For example, the user device 102 can download one or more other versions of the content in addition to the latest version to facilitate mapping to other content versions or to use a document version for which a more direct mapping is available. The versioning map creator 618 can abstract words and positions for a difference as a single entity, represented as Word(text,position), and store this data for each version and for each difference as position maps 612. For every pair of the latest version and the previous version of an eBook, the versioning map creator 618 can compute and align differences to generate forward and reverse position maps 612. Then, when the user device 602 requests a new version of the content, the digital marketplace 606 provides the appropriate position maps 612 to the user device in addition to the new version of the content. The user device 602 then uses the position maps 612 to migrate the digital asset annotations 616 to the new version of the content, as discussed above.

Figure 7:
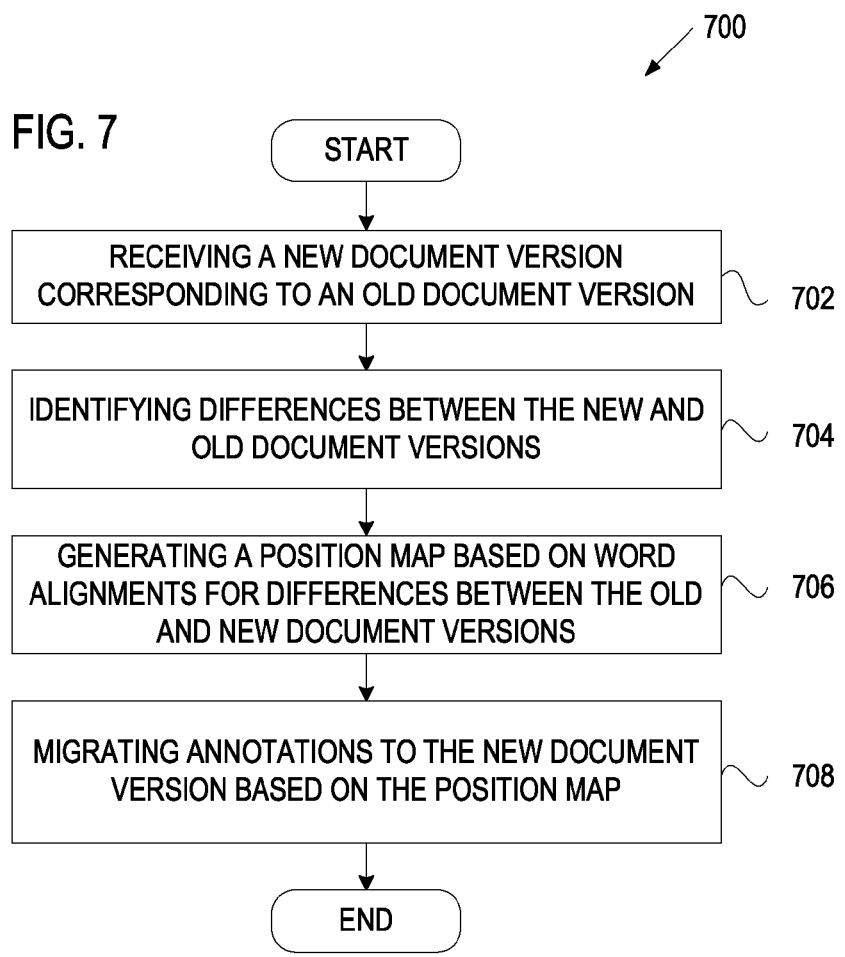
FIG. 7 illustrates a flow diagram of one embodiment of a method for migrating annotations to a new document version.

FIG. 7 illustrates a flow diagram of one embodiment of a method 700 for migrating annotations to a new document version. In one embodiment, method 700 is performed by a server (e.g., digital marketplace 106).

Figure 8:
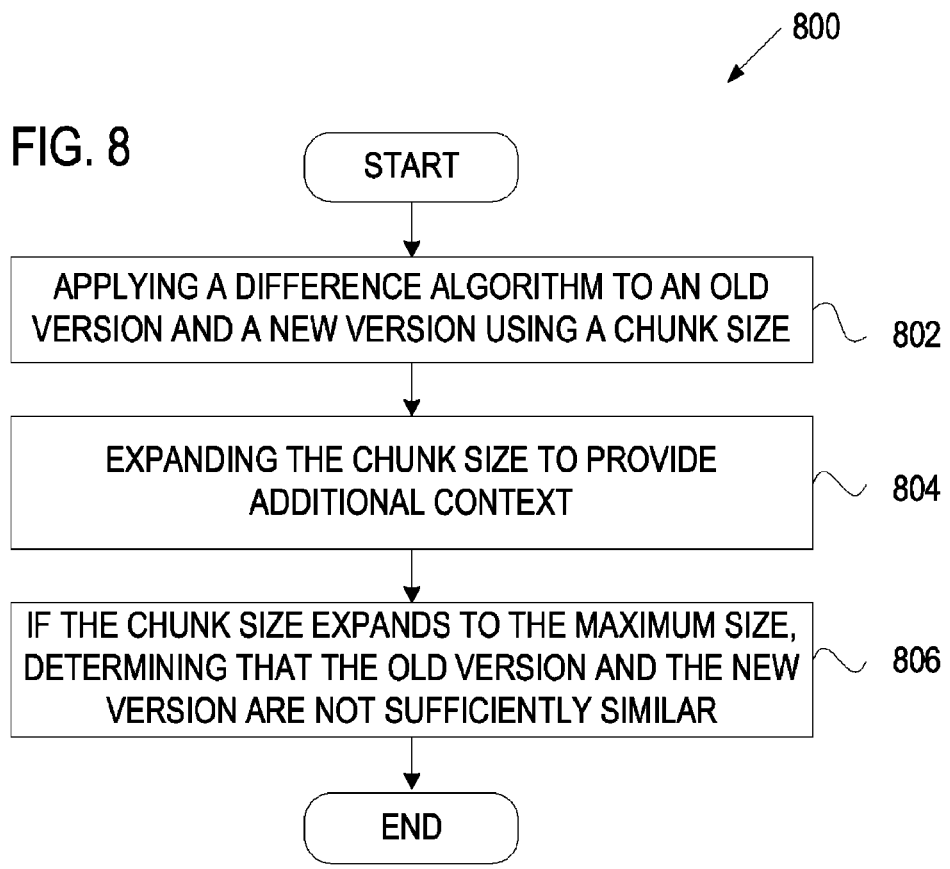
FIG. 8 illustrates a flow diagram of one embodiment of identifying differences between new and old document versions.

The server receives a new document version corresponding to an old document version (702) which may have user-generated annotations. The server identifies a set of differences between the new document version and the old document version (704). FIG. 8 illustrates a flow diagram of one embodiment of a method 800 for identifying differences between new and old document versions. The server can identify differences by applying a difference algorithm to an old document version and a new document version using a chunk size (802), and expanding the chunk size to provide additional context (804) when the current chunk size provides insufficient context for the difference or when the difference is larger than the chunk size. If the chunk size expands to a maximum size, such as 10,000 characters, then the server can make a determination that the old document version and the new document version are either completely different or are too different to migrate annotations between (806). If the chunk size remains under the maximum size, the server can use the differences detected in the words to enrich or modify an existing position map or to generate a new position map.

Next, the server performs word alignments. In one embodiment, the word alignments are performed by first determining the type for each difference. If the type for a respective difference is an insert or a delete, the server aligns the respective difference with a dummy word indicating a missing word. If the type for the respective difference is a small replacement less than a word size threshold, the server aligns corresponding words directly. If the type for the respective difference is a split word, the server aligns an old word in the old version with new words in the new version, and if the type for the respective difference is a merge word, the server aligns old words in the old version with a new word in the new version.

Figure 9:
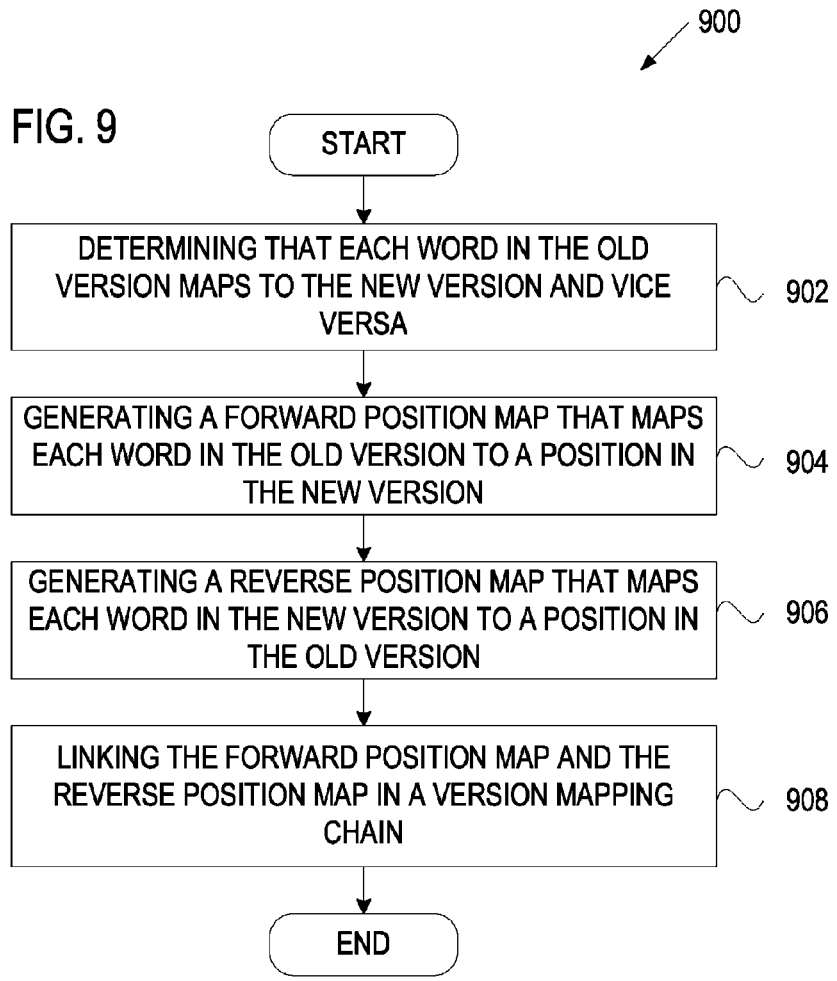
FIG. 9 illustrates a flow diagram of one embodiment of generating a position map.

Referring to FIG. 7, the server generates a position map based on the word alignments that maps differences from the old document version to the new document version (706). FIG. 9 illustrates a flow diagram of one embodiment of method 900 for generating a position map. Each word in the old document version maps to a location, word, or other entity in the new document version (902). Then the server can generate a forward position map that maps each word in the old document version to a position in the new document version (904), and vice versa, so that a reverse position map maps each word in the new document version to a position in the old document version (906). The server can further link the forward and reverse position maps in a version mapping chain, so that annotations can be easily migrated to earlier or later document versions by transforming the annotations through each position map in the chain in the proper direction.

Figure 10:
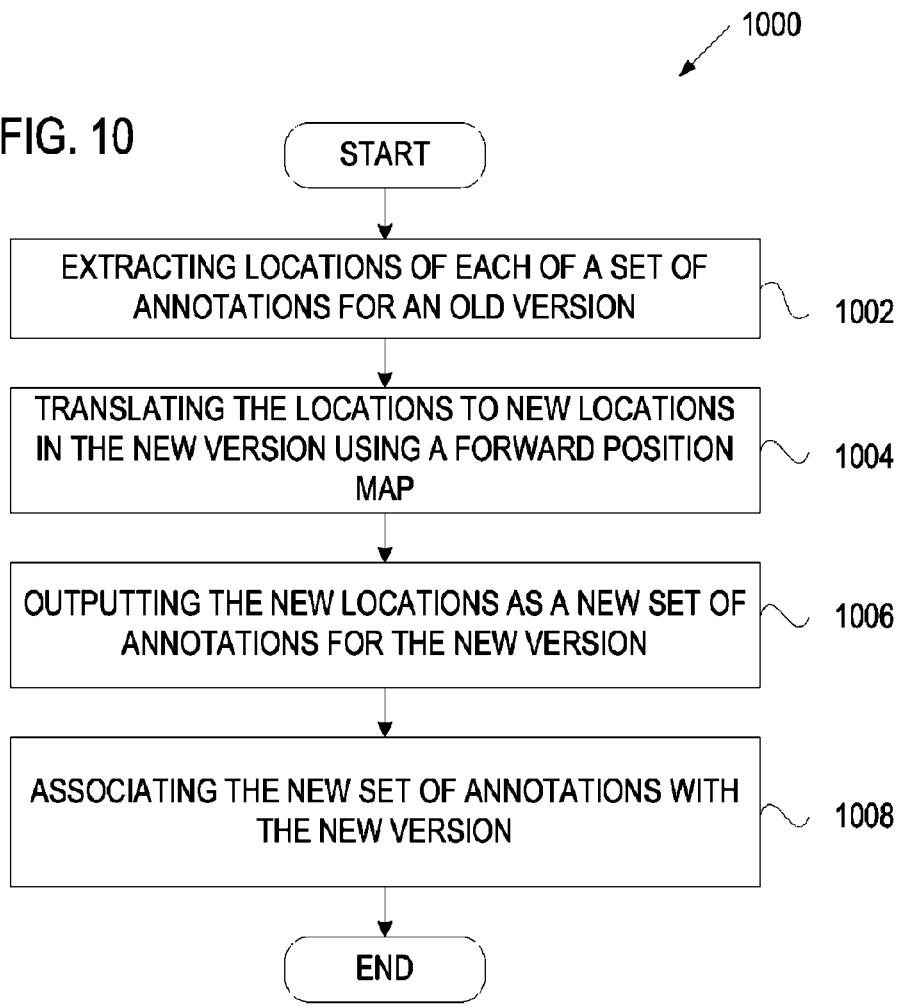
FIG. 10 illustrates a flow diagram of one embodiment of migrating annotations from an old document version to a new document version.

Referring again to FIG. 7, the server can further migrate the user-generated annotations to the new document version based on the position map (708). FIG. 10 illustrates a flow diagram of one embodiment of a method 1000 for migrating annotations from an old document version to a new document version. A user can generate, for a document, annotations locally on his or her device, and the device transmits those annotations to the server, such as for a backup or for sharing with others. The server can then process the annotations using various forward or reverse position maps and map the annotations to every other available version of the document or just to a subset of versions in circulation among client devices. In particular, the server can extract locations of each of a set of annotations for an old document version (1002), and translate those locations to new locations in the new document version using the forward position map (1004). When the locations are all translated, the server can output the new locations as a new set of annotations for the new document version (1006), or can modify the existing annotations using the new locations. The server can optionally associate the new set of annotations with the new document version (1008). In one embodiment, the server can generate a sidecar file containing the annotations for a particular version, or containing the annotations and maps for adapting the annotations to another version. The server can then provide to various client devices the sidecar file containing annotations specifically for the version of the document at the various client devices, or a universal sidecar that includes annotations and the necessary maps or instructions for adapting the annotations to any version of the document. A sidecar can be a separate file that stores data or metadata associated with a particular file or document. A sidecar can be associated with the document based on file name, metadata, file extension or some other mechanism.

In another embodiment, the server provides position maps to a user device when, for example, providing the new version to the user device or subsequently upon receiving a request for position maps from the user device. The user device may request position maps for the entire document version or for particular portions of the document version (e.g., if the user is only interested in annotations for a text book chapter that was recently covered in class).

The user device can receive position maps, extract locations of each of a set of annotations for an old document version, and translate those locations to new locations in the new document version using the forward position map. When the locations are all translated, the user device can output the new locations as a new set of annotations for the new document version, or can modify the existing annotations using the new locations. The user device can then associate the new set of annotations with the new document version.

In some embodiments, the user device uses the position maps to generate a list of changes between the old document version and the new document version, and presents the list of changes to the user. The user can review the list of changes and decide whether to request the annotations to be migrated to the new version. For example, if the changes are significant, the user may not want the annotations to be migrated.

In some embodiments, while migrating annotations from the old version to the new version, the user device can detect that an annotated section from the old version is no longer present in the new version. The user device can notify the user that the annotated section is not present in the new version and can optionally display this section and the associated annotations. The user device can also ask the user (e.g., by displaying a list of selectable options on the screen of the user device) to specify whether the annotations should be disregarded or added to a different section of the new document version.

In some embodiments, the user device can generates a list of annotations that have been migrated to the new document version and a list of annotations that have not been migrated to the new document version (e.g., if a corresponding section was no longer present in the new document version). The user device can present these lists to the user and can allow the user to modify the migrated annotations. For example, the user may request to remove some annotations or to move some annotations from one section to another section in the new document version.

Figure 11:
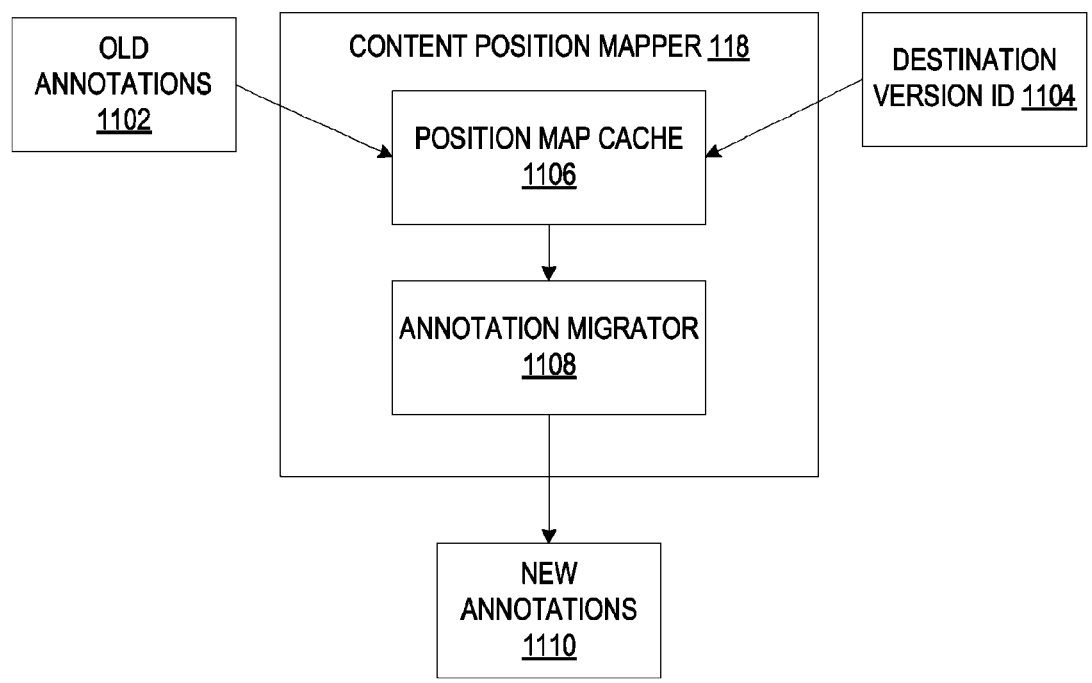
FIG. 11 illustrates an example content position mapper.

FIG. 11 illustrates an example content position mapper 118, as shown in FIG. 1. The content position mapper 118 takes as input old annotations 1102 created based on a previous version of the content, and a destination version ID 1104 indicating a target version to which to migrate the old annotations. The content position mapper 118 queries a position map cache or store 1106 to fetch precreated maps, and an annotation migrater 1108 migrates the old annotations 1102 to the destination version using the desired map and returns the new annotations 1110. The migration can replace, add and update portions of annotations to generate the new annotations 1110, such as positions, content, and lengths of annotations.

Figure 12:
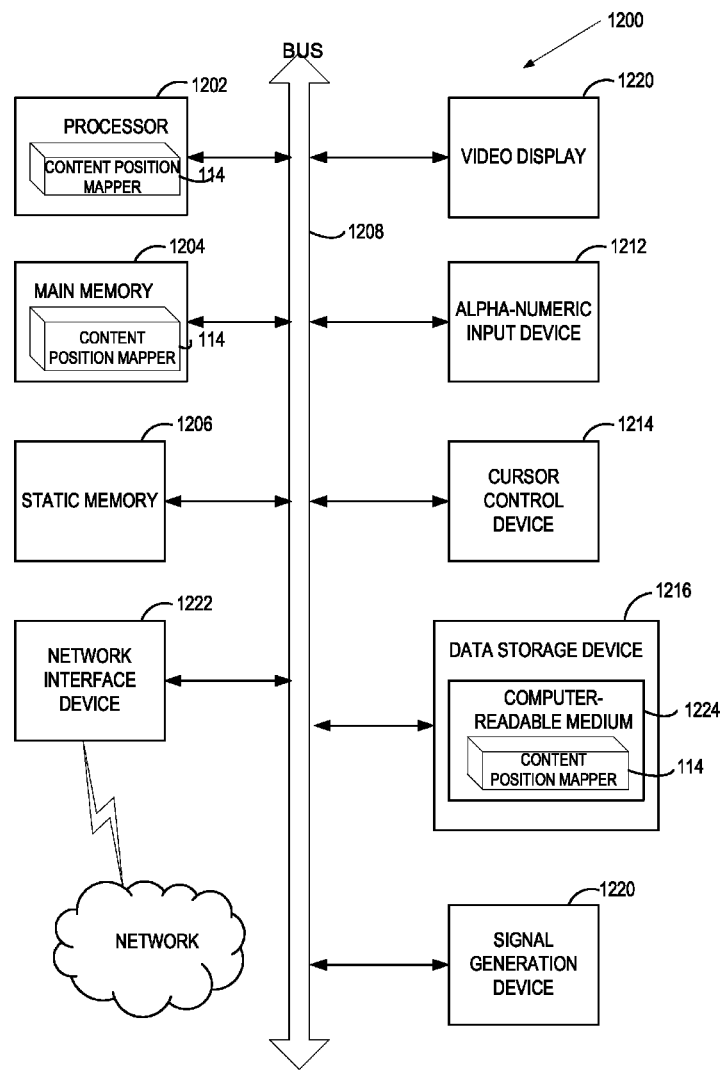
FIG. 12 illustrates a block diagram of one embodiment of a user device.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1218 (e.g., a data storage device), which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 1202 is configured to execute processing logic (e.g., instructions 1226) for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), other user input device such as a touch screen or a microphone, and a signal generation device 1220 (e.g., a speaker).

The secondary memory 1218 may include a machine-readable storage medium (or more specifically a computer-readable storage medium) 1224 on which is stored one or more sets of instructions 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

The computer-readable storage medium 1224 may also be used to store instructions which may correspond to the content position mapper m114 of FIG. 1, and/or a software library containing methods that call a content position mapper 118. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present set forth herein. The term "computer-readable storage medium" shall accordingly be taken to include, but not be limited to, solid-state memories and optical and magnetic media.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "generating", "migrating", "transmitting", "determining", "instructing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present disclosure may be provided as a computer program product, or software, that may include a machine-readable medium having stored thereon instructions, which may be used to program a computer system (or other electronic devices) to perform a process according to the principles disclosed herein. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

It is to be understood that the above description is intended to be illustrative, and not restrictive. Many other embodiments will be apparent to those of skill in the art upon reading and understanding the above description. Although the description includes references to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    receiving, via a processing device, a new document version corresponding to an old document version, wherein the old document version is associated with a plurality of user-generated annotations, each user-generated annotation being mapped to a particular portion of the old document version;
    aligning, via the processing device, words in the new document version with words in the old document version;
    determining, via the processing device, differences between the new document version and the old document version using the aligned words, the differences comprising a word having an original position in the old document version and the word having a new position in the new document version, where the original position is different than new position;
    generating, via the processing device, an entry in a position map, wherein the entry maps a first byte offset of the original position of the word in the old document version to a second byte offset of the new position of the word in the new document version, the entry comprising the word, the first byte offset, and the second byte offset; and
    causing, via the processing device, the user-generated annotations to be transferred to the new document version based on the position map.

2. The method of claim 1, wherein each of the differences has an associated difference type comprising at least one of insertion, deletion, change, transposition, typographical error, split word, merged word, formatting change or style change.

3. The method of claim 1, wherein causing the user-generated annotations to be transferred to the new document version based on the position map comprises:
    determining, for each user-generated annotation, a position within the old document version that corresponds with the particular portion of the old document version to which the user-generated annotation is mapped;
    identifying, based on the position map, a position within the new document version that maps to the position within the old document version; and
    associating the user-generated annotation with the identified position within the new document version.

4. The method of claim 1, wherein causing the user-generated annotations to be transferred to the new document version based on the position map comprises:
    sending the position map to a user device, wherein the user device uses the position map to transfer the user-generated annotations to the new document.

5. The method of claim 1, wherein the position map is at least one of a forward position map that maps differences from the old document version to the new document version, or a reverse position map that maps differences from the new document version to the old document version.

6. A method comprising:
    receiving a new document version corresponding to an old document version, wherein the old document version is associated with a plurality of user-generated annotations, each user-generated annotation being mapped to a particular position within the old document version;
    identifying, by a processing device, a position map that maps differences between the old document version and the new document version, the differences comprising a word having an original position in the old document version and the word having a new position in the new document version, where the original position is different than new position, wherein the position map comprises an entry, the entry comprising the word, a first byte offset of the original position of the word in the old document version, and a second byte offset of the new position of the word in the new document version;
    determining, based on the position map, a position of a user-generated annotation of the plurality of user-generated annotations within the new document version that maps to a position within the old document version that corresponds with the user-generated annotation; and
    associating, by the processing device, the user-generated annotation with the determined position within the new document version to transfer the user-generated annotation to the new document version.

7. The method of claim 6, wherein each of the differences has an associated difference type comprising at least one of insertion, deletion, change, transposition, typographical error, split word, merged word, formatting change or style change.

8. The method of claim 6, wherein identifying the position map that maps differences between the old document version and the new document version comprises:
    receiving the position map from a server.

9. The method of claim 6, wherein identifying the position map that maps differences between the old document version and the new document version comprises:

aligning words in the new document version to words in the old document version;

determining the differences between the new document version and the old document version using the aligned words; and generating the position map that maps the original position of the word in the old document version to the new position of the word in the new document version.

10. The method of claim 6, wherein the position map is at least one of a forward position map that maps differences from the old document version to the new document version, or a reverse position map that maps differences from the new document version to the old document version.

11. A system comprising:
a processing device;
a memory having stored therein instructions which, when executed by the processing device, cause the processing device to:
receive, from a client device, a request for annotations associated with a first version of a document, wherein the client device has a second version of the document that is different from the first version;
select a difference position map that indicates differences between the first version and the second version, the differences comprising a word having an original position in the first version of the document and the word having a new position in the second version of the document, where the original position is different than new position, wherein the difference position map comprises an entry, the entry comprising the word, a first byte offset of the original position of the word in the first version of the document, and a second byte offset of the new position of the word in the second version of the document;
transfer the annotations from the first version of the document to the second version of the document based on the difference position map; and
transmit the transferred annotations to the client device in response to the request.

12. The system of claim 11, wherein the difference position map is generated using a difference algorithm that computes differences between words using a longest common sequence of words and a fuzzy string match algorithm that computes differences between words using fuzzy word similarity matrix.

13. The system of claim 12, wherein the instructions, when executed by the processing device, further cause the processing device to:
when the difference algorithm is unable to compute a difference between a sequence of words, applying the fuzzy string match algorithm to the sequence of words.

14. The system of claim 13, wherein the difference position map is generated by iterating over the first version and the second version based on a size of the sequence of words.

15. The system of claim 13, wherein the instructions, when executed by the processing device, further cause the processing device to:
expand or shrink a size of the sequence of words when a first sequence in the first version and a corresponding second sequence in the second version are below a similarity threshold.

16. The system of claim 11, wherein the difference position map further indicates at least one of a position for each difference, a difference type for each difference, or a length of each difference.

17. The system of claim 11, wherein the difference position map comprises positions of words in the first version and positions of corresponding words in the second version.

18. The system of claim 11, wherein the difference position map is selected from a set of difference position maps for a plurality of document versions.

19. A non-transitory computer-readable storage medium having stored therein instructions which, when executed by a processing device, cause the processing device to perform operations comprising:
aligning, by the processing device, words in a first version of a document with words in a second version of the document, the first version comprising annotations;
identifying differences between the first version of the document and the second version of the document, the differences comprising a word having an original position in the first version of the document and a new position in the second version of the document; and
generating, by the processing device, an entry in a position map, wherein the entry that maps a first byte offset of the original position of the word in the first version of the document to a second byte offset of the new position of the word in the second version of the document, the entry comprising the word, the first byte offset, and the second byte offset, the position map facilitating a transfer of the annotations from the first version to the second version.

20. The non-transitory computer-readable storage medium of claim 19, wherein generating the position map comprises:
determining a type for each of the differences;
determining that a difference comprises a split word; and
aligning an old word in the first version with new words in the second version.

21. The non-transitory computer-readable storage medium of claim 19, wherein generating alignments further comprises:
determining that a difference is not an insert or a delete, a small replacement, a split word, or a merge word; and
applying a word sequence alignment algorithm to generate an alignment for the difference.

22. The non-transitory computer-readable storage medium of claim 21, wherein the word sequence alignment algorithm is customized for aligning word sequences, wherein the word sequence alignment algorithm outputs a word similarity matrix.

23. The non-transitory computer-readable storage medium of claim 19, wherein the instructions, when executed by a processing device, further cause the processing device to perform operations comprising:
cleaning the differences.

24. The non-transitory computer-readable storage medium of claim 23, wherein cleaning the set of differences comprises at least one of:
merging differences that are less than a distance threshold apart; and
identifying and removing false positive matches.

* * * * *